US012475543B2

(12) United States Patent
Son et al.

(10) Patent No.: US 12,475,543 B2
(45) Date of Patent: Nov. 18, 2025

(54) METHOD FOR PERFORMING VIGNETTING FUNCTION AND WEARABLE ELECTRONIC DEVICE SUPPORTING THE SAME

(71) Applicant: Samsung Electronics Co., Ltd., Suwon-si (KR)

(72) Inventors: Dongil Son, Suwon-si (KR); Changtaek Kang, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 18/364,876

(22) Filed: Aug. 3, 2023

(65) Prior Publication Data
US 2024/0078642 A1    Mar. 7, 2024

Related U.S. Application Data

(63) Continuation of application No. PCT/KR2023/010673, filed on Jul. 24, 2023.

(30) Foreign Application Priority Data

Sep. 1, 2022 (KR) .......................... 10-2022-0110972

(51) Int. Cl.
*G06T 5/70* (2024.01)
*G06F 3/01* (2006.01)
(52) U.S. Cl.
CPC ................ *G06T 5/70* (2024.01); *G06F 3/011* (2013.01)

(58) Field of Classification Search
CPC .................................. G06T 5/70; G06F 3/011
See application file for complete search history.

(56) References Cited

U.S. PATENT DOCUMENTS

| 2016/0178904 | A1 | 6/2016 | Deleeuw et al. |
| 2017/0255258 | A1* | 9/2017 | Feiner ............... G02B 27/0172 |
| 2017/0290504 | A1 | 10/2017 | Khaderi et al. |

(Continued)

FOREIGN PATENT DOCUMENTS

| KR | 10-2018-0045644 A | 5/2018 |
| KR | 10-1855863 B1 | 5/2018 |

(Continued)

OTHER PUBLICATIONS

Porcino, Thiago, et al. "Automatic recommendation of strategies for minimizing discomfort in virtual environments." arXiv preprint arXiv:2006.15432 (2020). (Year: 2020).*

(Continued)

*Primary Examiner* — Yu Chen
(74) *Attorney, Agent, or Firm* — Jefferson IP Law, LLP

(57) ABSTRACT

A wearable electronic device is provided. The wearable electronic device includes a display and at least one processor. The at least one processor may be configured to perform a virtual reality (VR) application. The at least one processor may be configured to detect movement of an avatar corresponding to a user in a virtual space of VR content displayed while the VR application is being executed. The at least one processor may be configured to display a screen of the VR content to which a changeable vignetting effect is applied through the display, based on the detection of the movement of the avatar.

19 Claims, 12 Drawing Sheets

(56) References Cited

U.S. PATENT DOCUMENTS

| | | | |
|---|---|---|---|
| 2018/0121069 A1* | 5/2018 | DiVerdi | G06T 11/60 |
| 2018/0288391 A1 | 10/2018 | Lee et al. | |
| 2019/0171280 A1 | 6/2019 | Son et al. | |
| 2019/0180448 A1 | 6/2019 | Ro et al. | |
| 2019/0220089 A1* | 7/2019 | Kakizawa | A63F 13/807 |
| 2020/0327408 A1 | 10/2020 | Ro et al. | |
| 2021/0278665 A1* | 9/2021 | Jeon | H04N 13/398 |
| 2021/0350762 A1* | 11/2021 | Okumura | G06F 3/147 |
| 2022/0011854 A1 | 1/2022 | Kim et al. | |
| 2022/0276696 A1* | 9/2022 | Brown | G06F 3/1423 |
| 2023/0068927 A1* | 3/2023 | Choi | G06T 19/006 |
| 2024/0069625 A1* | 2/2024 | Lal | G06F 3/013 |

FOREIGN PATENT DOCUMENTS

| | | |
|---|---|---|
| KR | 10-1951406 B1 | 2/2019 |
| KR | 10-2019-0021812 A | 3/2019 |
| KR | 10-2019-0027354 A | 3/2019 |
| KR | 10-2019-0066428 A | 6/2019 |
| KR | 10-2019-0069684 A | 6/2019 |
| KR | 10-1987225 B1 | 6/2019 |
| KR | 10-2019-0089585 A | 7/2019 |
| KR | 10-2020-0007206 A | 1/2020 |
| KR | 10-2097908 B1 | 5/2020 |
| KR | 10-2020-0060973 A | 6/2020 |
| KR | 10-2020-0069002 A | 6/2020 |
| KR | 10-2020-0073109 A | 6/2020 |
| KR | 10-2150483 B1 | 9/2020 |
| KR | 10-2188335 B1 | 12/2020 |
| KR | 10-2316327 B1 | 10/2021 |
| KR | 10-2022-0078192 A | 6/2022 |
| WO | WO-2018234318 A1 * | 12/2018 |

OTHER PUBLICATIONS

Norouzi, Nahal, Gerd Bruder, and Greg Welch. "Assessing vignetting as a means to reduce VR sickness during amplified head rotations." Proceedings of the 15th ACM Symposium on Applied Perception. 2018. (Year: 2018).*

International Search Report with English translation dated Oct. 20, 2023; Korean Appln. No. PCT/KR2023/010673.

* cited by examiner

METHOD FOR PERFORMING VIGNETTING FUNCTION AND WEARABLE ELECTRONIC DEVICE SUPPORTING THE SAME

CROSS-REFERENCE TO RELATED APPLICATION(S)

This application is a continuation application, claiming priority under § 365(c), of an International application No. PCT/KR2023/010673, filed on Jul. 24, 2023, which is based on and claims the benefit of a Korean patent application number 10-2022-0110972, filed on Sep. 1, 2022, in the Korean Intellectual Property Office, the disclosure of which is incorporated by reference herein in its entirety.

TECHNICAL FIELD

The disclosure relates to a method for performing vignetting function and a wearable electronic device supporting the same.

BACKGROUND ART

An increasing number of services and additional features are being offered through wearable electronic devices such as augmented reality glasses (AR glasses), virtual reality glasses (VR glasses), and head mounted display (HMD) devices. To meet the needs of various users and raise use efficiency of electronic devices, communication service carriers or device manufacturers are jumping into competitions to develop electronic devices with differentiated and diversified functionalities. Accordingly, various functions that are provided through wearable electronic devices are evolving more and more.

VR glasses, when worn on the user's head, may provide a realistic experience to the user by displaying virtual images. VR glasses can replace the usability of smartphones in a variety of areas, such as gaming entertainment, education, and social networking services. Through VR glasses worn on the head, users may be provided with life-like content and interact with it to feel like they are in a virtual world.

The above information is presented as background information only to assist with an understanding of the disclosure. No determination has been made, and no assertion is made, as to whether any of the above might be applicable as prior art with regard to the disclosure.

DISCLOSURE OF THE INVENTION

Solution to Problems

The VR glasses may control VR content based on movement of the VR glasses by head movement of a user wearing the VR glasses, an input through a controller, and/or a movement of a sensor attached to the user's body. For example, the VR glasses, while the VR content is being provided, may move an avatar (also referred to as a "character") corresponding to the user in a virtual space of virtual reality based on a movement of the VR glasses, an input through a controller, and/or a movement of a sensor attached to the user's body. As the VR glasses moves the avatar corresponding to the user in the virtual space, the user may be provided with the same experience as moving in real life. However, while the avatar corresponding to the user is moving in the virtual space, if the movement of the avatar does not correspond to the movement of the user (e.g., if the user does not move while the avatar is moving), the user would suffer from motion sickness (also referred to as "VR sickness" or "cyber sickness"). Such motion sickness may be a symptom of a loss of balance caused by a mixture of visual information received through the user's eyes and sensory information received through the vestibular organs (and semicircular canals) of the user's ears in a scene that is changed by the movement of the avatar corresponding to the user.

The vignetting function may be one of various ways to minimize (or eliminate) such motion sickness. The vignetting function may be a function of applying a vignetting effect (also referred to as "tunneling effect") to a screen displayed through the VR glasses. For example, the vignetting function may minimize motion sickness by narrowing a user's viewing angle for a screen displayed through VR glasses. In one way, if the vignetting function is performed in a state in which motion sickness is not experienced (or in a state in which the user has adapted to the virtual environment), the user's immersion in VR content may be hindered.

The VR glasses may activate or deactivate the vignetting function for each application based on a user input. In this case, the user may experience inconvenience in frequently inputting an input for activating or inactivating the vignetting function through the VR glasses in a state in which the user experiences motion sickness or in a state in which the user does not experience.

Aspects of the disclosure are to address at least the above-mentioned problems and/or disadvantages and to provide at least the advantages described below. Accordingly, an aspect of the disclosure is to provide a method for performing a vignetting function and a wearable electronic device supporting the same, which may provide a screen to which a changeable vignetting effect is applied based on a movement of an avatar corresponding to a user in a virtual space.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a display and at least one processor. The at least one processor may be configured to execute a VR application. The at least one processor may be configured to detect a movement of an avatar corresponding to a user in a virtual space of a VR content displayed while the VR application is executed. The at least one processor may be configured to display, based on detecting the movement of the avatar, a screen of the VR content to which a changeable vignetting effect is applied through the display.

In accordance with another aspect of the disclosure, a method of performing a vignetting function in a wearable electronic device is provided. The method includes an operation of executing a VR application. The method includes detecting a movement of an avatar corresponding to a user in a virtual space of VR contents displayed while the VR application is executed. The method includes displaying, based on detecting the movement of the avatar, a screen of the VR content to which a changeable vignetting effect is applied through a display 221 of the wearable electronic device.

According to an embodiment, a non-transitory computer-readable medium stores computer-executable instructions configured to, when executed, enable a wearable electronic device including at least one processor to execute a VR application. The computer-executable instructions may be configured to, when executed, enable the wearable electronic device including the at least one processor to detect a movement of an avatar corresponding to a user in a virtual space of VR content displayed while the VR application is being executed. The computer-executable instructions may be configured to, when executed, enable the wearable electronic device including the at least one processor display, based on detecting the movement of the avatar, a screen of the VR content to which a changeable vignetting effect is applied through the display.

According to an embodiment, a method for performing a vignetting function and a wearable electronic device supporting the same may minimize motion sickness by providing a screen to which a changeable vignetting effect is applied based on the movement of an avatar corresponding to a user in a virtual space, and improve the user's immersion in VR content.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
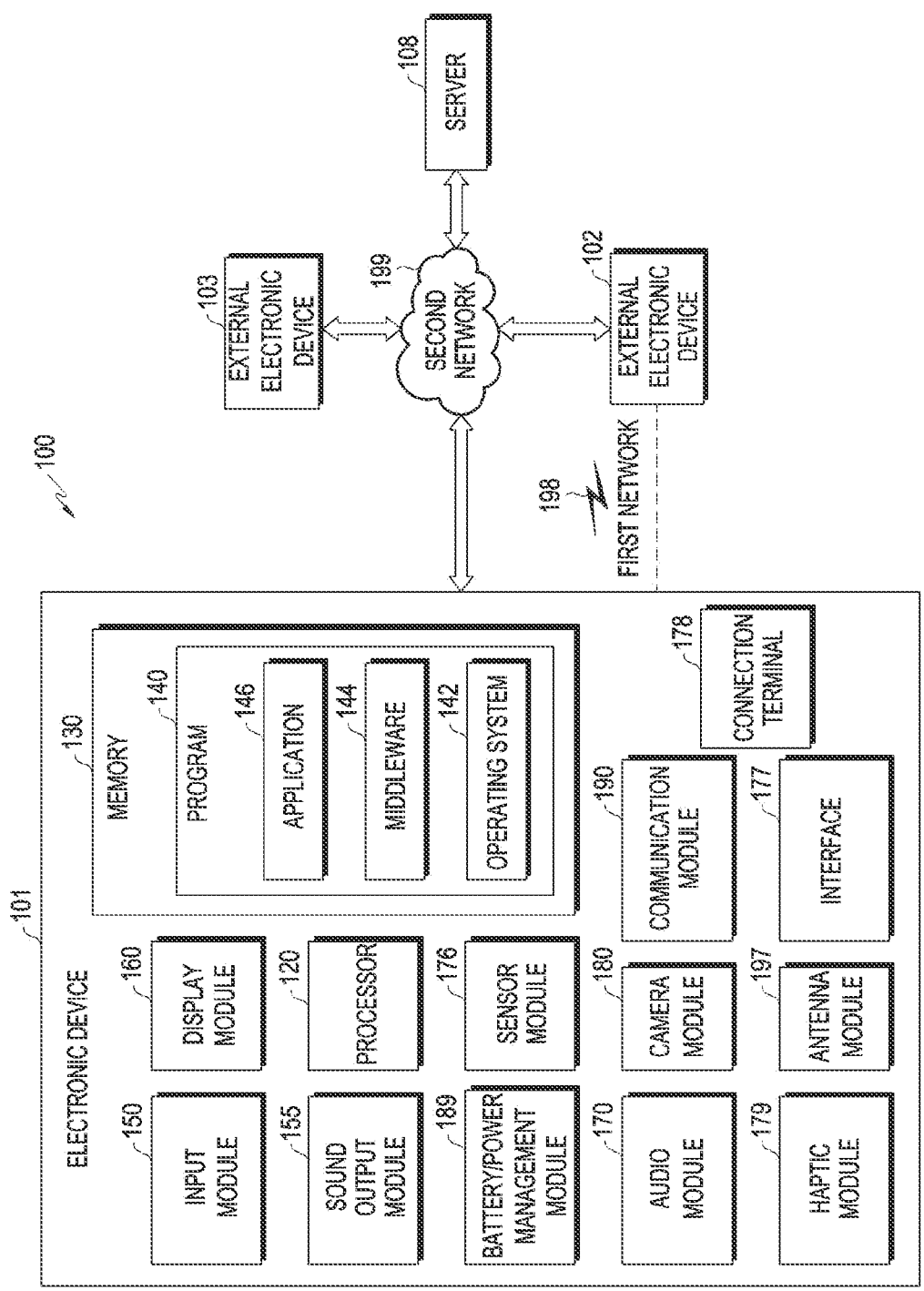
FIG. 1 is a block diagram illustrating an electronic device according to an embodiment of the disclosure.

FIG. 1 is a block diagram illustrating an electronic device 101 according to an embodiment of the disclosure.

The electronic device 101 may be, for example, a wearable electronic device worn on a user's head, such as an AR glass, a VR glass, and/or an HMD device. The electronic device 101 may also be referred to as a wearable electronic device.

The external electronic devices 102 and 103 each may be a device of the same or a different type from the electronic device 101. According to an embodiment, all or some of operations to be executed at the electronic device 101 may be executed at one or more of the external electronic devices (external electronic devices 102 and 103 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. For example, the external electronic device 102 may render and transfer, to the electronic device 101, content data executed on an application, and the electronic device 101 receiving the data may output the content data to a display module. If the electronic device 101 detects the user's motion through, e.g., an inertial measurement unit (IMU) sensor, the processor 120 of the electronic device 101 may correct the rendering data received from the external electronic device 102 based on the motion information and output it to the display module 160. Alternatively, the electronic device 101 may transfer the motion information to the external electronic device 102 and request rendering so that screen data is updated accordingly. According to various embodiments, the external electronic device 102 may be various types of devices, such as a smart phone or a case device capable of storing and charging the electronic device 101.

According to an embodiment, the electronic device 101 may communicate with an external electronic device 102 via a first network 198 (e.g., a short-range wireless communication network), and/or an external electronic device 103 or a server 108 via a second network 199 (e.g., a long-range wireless communication network). According to an embodiment, the electronic device 101 may communicate with another electronic device via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module and/or a battery 189, a communication module 190, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

According to an embodiment, the processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) onto a volatile memory, process the command or the data stored in the volatile memory, and store resulting data in a non-volatile memory. According to an embodiment, the processor 120 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the electronic device 101 includes the main processor and the auxiliary processor, the auxiliary processor may be configured to use lower power than the main processor or to be specified for a designated function. The auxiliary processor may be implemented separately from, or as part of, the main processor. The auxiliary processor may control at least some of functions or states related to at least one component (e.g., display module 160, sensor module 176, or communication module 190) of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor or a communication processor) may be implemented as part of another component (e.g., the camera module 180 or the communication module 190) functionally related to the auxiliary processor. According to an embodiment, the auxiliary processor (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

According to an embodiment, the memory 130 may store various data used by at least one component (e.g., the processor 120 or a sensor module 176) of the electronic device 101. The various data may include, for example, software (e.g., the program 140) and input data or output data for a command related thereto. The memory 130 may include a volatile memory or a non-volatile memory.

According to an embodiment, the program 140 may be stored in the memory 130 as software, and may include, for example, an operating system (OS) 142, middleware 144, or an application 146.

According to an embodiment, the input module 150 may receive a command or data to be used by other component (e.g., the processor 120) of the electronic device 101, from the outside (e.g., a user) of the electronic device 101. The input module 150 may include, but is not limited to, a microphone, a button, and/or a touch pad.

According to an embodiment, the sound output module 155 may output sound signals to the outside of the electronic device 101. The sound output module 155 may include, e.g., a speaker. The speaker may be used for general purposes, such as playing multimedia or playing record.

According to an embodiment, the display module 160 may visually provide information to the outside (e.g., the user) of the electronic device 101. For example, when the electronic device 101 is implemented as AR glasses, the display module 160 may include, but is not limited thereto, e.g., a liquid crystal display (LCD), a digital mirror device (DMD), a liquid crystal on silicon (LCoS), light emitting diode (LED) on silicon (LEDoS), organic light emitting diode (OLED), or micro light emitting diode (micro LED). The display module 160 may have different implementation forms depending on the type of electronic device 101.

According to an embodiment, the audio module 170 may convert a sound into an electrical signal and vice versa. According to an embodiment, the audio module 170 may obtain the sound via the input module 150, or output the sound via the sound output module 155 or a headphone of an external electronic device (e.g., external electronic device 102) directly (e.g., wiredly) or wirelessly coupled with the electronic device 101. The external electronic device 102 may be, e.g., a mobile device, such as a smart phone or tablet PC, but is not limited thereto.

According to an embodiment, the sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, and/or an illuminance sensor.

According to an embodiment, the interface 177 may support one or more specified protocols to be used for the electronic device 101 to be coupled with the external electronic device (e.g., external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

According to an embodiment, the connecting terminal 178 may include a connector via which the electronic device 101 may be physically connected with the external electronic device (e.g., external electronic device 102). According to an embodiment, the connecting terminal 178 may include, for example, a HDMI connector, a USB connector, an SD card connector, or an audio connector (e.g., a headphone connector).

According to an embodiment, the haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

According to an embodiment, the camera module 180 may capture a still image and a video. According to an embodiment, the camera module 180 may include one or more lenses, image sensors, image signal processors, or flashes.

According to an embodiment, the power management module and/or battery 189 may manage power supplied to the electronic device 101. According to an embodiment, the power management module and/or battery 189 may be implemented as at least part of, for example, a power management integrated circuit (PMIC). The power management module and/or the battery 189 may supply power to at least one component of the electronic device 101. According to an embodiment, the power supply module and/or battery 189 may include, for example, a primary cell which is not rechargeable, a secondary cell which is rechargeable, or a fuel cell.

According to an embodiment, the communication module 190 may support establishing a direct (e.g., wired) communication channel or a wireless communication channel between the electronic device 101 and the external electronic device (e.g., external electronic device 102, external electronic device 103, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device 102 or 103 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module may identify or authenticate the electronic device 101 in a communication network, such as the first network 198 or the second network 199, using subscriber information (e.g., international mobile subscriber identity (IMSI)) stored in the subscriber identification module.

The wireless communication module may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., the millimeter wave (mmWave) band) to achieve, e.g., a high data transmission rate. The wireless communication module may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module may support various requirements specified in the electronic device 101, an external electronic device (e.g., the external electronic device 103), or a network system (e.g., the second network 199). According to an embodiment, the wireless communication module may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. As described above, when the electronic device 101 supports cellular communication, such as 4G and 5G, the electronic device 101 may be referred to as a standalone (SA) type electronic device. Meanwhile, the electronic device 101 may be implemented not to support cellular communication, such as 4G and 5G. In this case, the electronic device 101 may use the Internet via the external electronic device 102 supporting cellular communication using the first network 198 in which case the electronic device 101 may be referred to as a non-standalone type electronic device.

According to an embodiment, the antenna module 197 may transmit or receive a signal or power to or from the outside (e.g., the external electronic device). According to an embodiment, the antenna module 197 may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 102 or 103 via the server 108 coupled with the second network 199. The external electronic devices 102 and 103 each may be a device of the same or a different type from the electronic device 101. According to an embodiment, all or some of operations to be executed at the electronic device 101 may be executed at one or more of the external electronic devices (external electronic devices 102 and 103 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 103 may include an Internet-of-things (IoT) device. The server 108 may be an intelligent server using machine learning and/or a neural network. According to an embodiment, the external electronic device 103 or the server 108 may be included in the second network 199. The electronic device 101 may be applied to intelligent services (e.g., smart home, smart city, smart car, or health-care) based on 5G communication technology or IoT-related technology.

Figure 2:
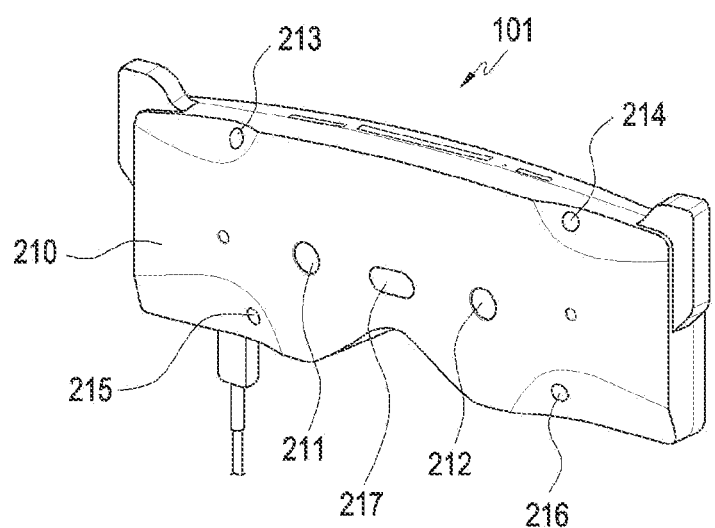
FIG. 2 is a diagram illustrating a front view of an electronic device according to an embodiment of the disclosure.

FIG. 2 is a diagram illustrating a front view of an electronic device according to an embodiment of the disclosure.

Figure 3:
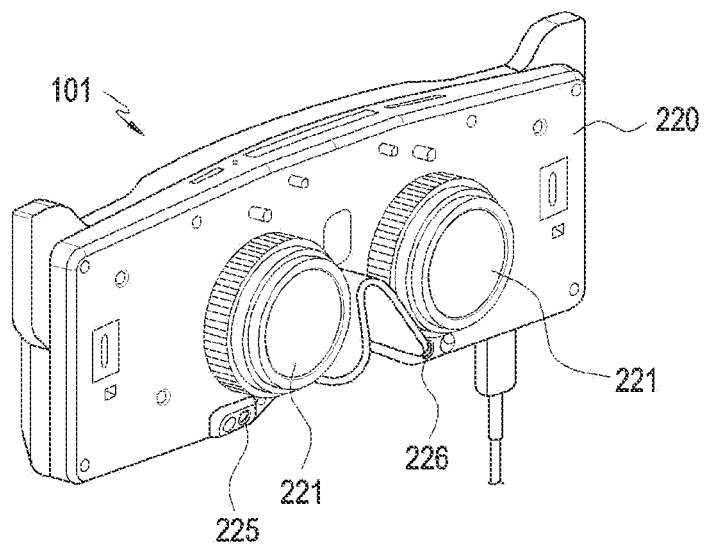
FIG. 3 is a diagram illustrating a rear view of an electronic device according to an embodiment of the disclosure.

FIG. 3 is a diagram illustrating a rear view of an electronic device according to an embodiment of the disclosure.

Referring to FIGS. 2 and 3, in an embodiment, VST camera modules 211 and 212 for video see through (VST), a plurality of camera modules 213, 214, 215, and 216, and/or a depth sensor 217 may be disposed on the first surface 210 of the housing. For example, the VST camera modules 211 and 212, the multiple camera modules 213, 214, 215, and 216, and/or the depth sensors 217 may be exposed through openings formed on the first surface 210 of the housing.

In an embodiment, the VST camera modules 211 and 212 may obtain images related to a surrounding environment of the electronic device. The images acquired by the VST camera modules 211 and 212 may be provided to a user as at least part of VST content.

In an embodiment, the plurality of camera modules 213, 214, 215, and 216 may acquire an image while the electronic device is worn by the user. The image obtained through multiple camera modules 213, 214, 215, 216 may be used for simplified localization and mapping (SLAM), 6 degrees of freedom (6 DoF), subject recognition, and/or tracking. In an embodiment, depth sensor 217 may be used to identify a distance to an object, such as a time of flight (TOF). In addition to or in replacement of the depth sensor 217, the plurality of camera modules 213, 214, 215, and 216 may identify the distance to the object.

According to one embodiment, the camera modules 215 and 216 for face recognition and/or the display 221 (and/or lens) may be disposed on a second surface 220 of the housing.

In an embodiment, the camera modules 225 and 226 for face recognition may be used for recognizing a user's face.

In an embodiment, the display 221 (and/or lenses) may be disposed on the second surface 220 of the electronic device 101 facing the face while the electronic device 101 is worn on the user's face. In an embodiment, the display 221 (and/or lens) may display a screen including various information while the electronic device 101 is worn by the user.

In an embodiment, although not shown in FIGS. 2 and 3, the electronic device 101 may further include one or more components. For example, the electronic device 101 may further comprise a proximity sensor, a touch sensor, and/or a pressure sensor for detecting that the electronic device is worn on a user (e.g., the user's face). For example, the electronic device 101 may further comprise a fingerprint sensor (optical or ultrasonic fingerprint sensor). For example, the electronic device 101 may further comprise at least one key (or a button).

In an embodiment, the electronic device 101 may not comprise some of the components shown in FIGS. 2 and 3. For example, the electronic device 101 may not comprise the camera modules 215 and 216 among the plurality of camera modules 213, 214, 215, and 216.

In an embodiment, the electronic device 101 may further comprise at least one component among the components of the electronic device 101 shown in FIG. 1.

In an embodiment, FIGS. 2 and 3 illustrate the electronic device 101 using the VST method, but is not limited thereto. For example, an operation of performing a vignetting function to be described below may be applied to all wearable electronic devices capable of providing VR content. For example, the operation of performing the vignetting function to be described below may be applied to a VR electronic device that does not comprise the VST camera modules 211 and 212 for the VST. Further, the operation of performing the vignetting function to be described below may be applied to the AR glass.

The wearable electronic device 101 according to an embodiment may comprise a display 221 and at least one processor 120. At least one processor 120 may be configured to execute a VR application. At least one processor 120 may be configured to detect a movement of an avatar corresponding to a user in a virtual space of VR content displayed while the VR application is executed. At least one processor 120 may be configured to display a screen of the VR content to which a changeable vignetting effect is applied through the display 221, based on detecting the movement of the avatar.

In an embodiment, the at least one processor 120 is configured to start counting for a time set in a timer, and apply the vignetting effect to the screen of the VR content while performing the counting.

In an embodiment, the at least one processor 120 may be configured to gradually reduce a vignetting area within the screen to which the vignetting effect is applied while performing the counting.

In an embodiment, the at least one processor 120 may determine whether the virtual space is changed from a first virtual space to a second virtual space, and initialize the timer based on identifying that the virtual space is changed from the first virtual space to the second virtual space.

In an embodiment, the at least one processor 120 may classify the time set in the timer into a plurality of time intervals, identify a time interval to which a time currently set in the timer belongs among the plurality of time intervals, and apply the vignetting effect to a vignetting area having a size corresponding to the identified time interval.

In an embodiment, the at least one processor 120 determines a speed at which the avatar moves in the virtual space, and determine, based on the determined speed, a vignetting area to which the vignetting effect is applied within the screen.

In an embodiment, the wearable electronic device 101 may further comprise a sensor, and the at least one processor 120 may detect the user's motion through the sensor, and apply the vignetting effect based on identifying that the movement of the avatar does not correspond to the movement of the user, wherein the vignetting effect, based on identifying that the movement of the avatar corresponds to the movement of the user, is not applied.

In an embodiment, the at least one processor 120 may identify whether the movement of the avatar occurs within a designated range of the virtual space, and apply the vignetting effect, based on identifying that the avatar moves outside the designated range of the virtual space by the movement of the avatar, wherein the vignetting effect, based on identifying that the movement of the avatar occurs within the designated range of the virtual space, is not applied.

In an embodiment, the at least one processor 120 may obtain biometric signal of a user, determine a degree of motion sickness of the user, based on the biometric signal, and control a vignetting function, based on the degree of motion sickness of the user.

In an embodiment, the avatar is moved by a controller or by a virtual transportation means in which the avatar rides in the virtual space.

Figure 4:
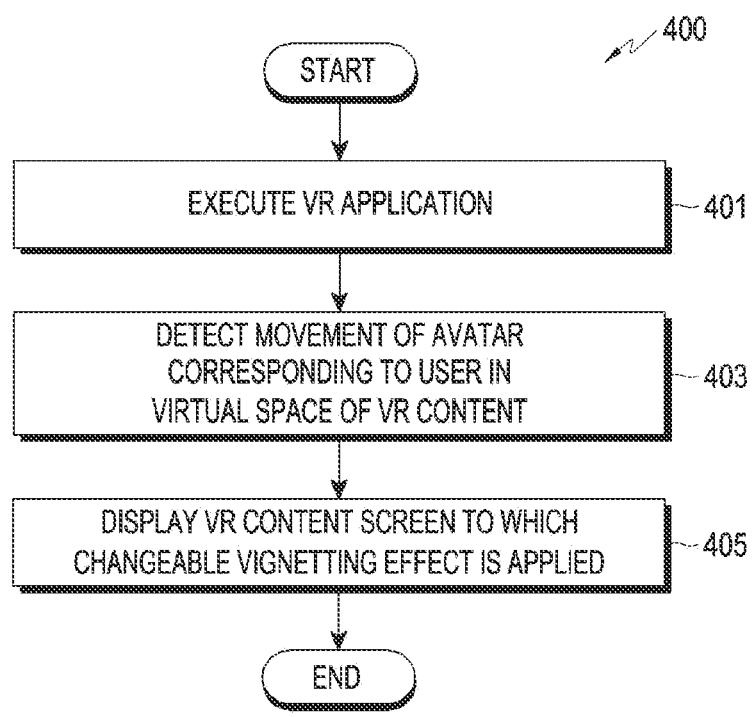
FIG. 4 is a flowchart illustrating a method of performing a vignetting function according to an embodiment of the disclosure.

FIG. 4 is a flowchart 400 illustrating a method of performing a vignetting function according to an embodiment of the disclosure.

Figure 5:
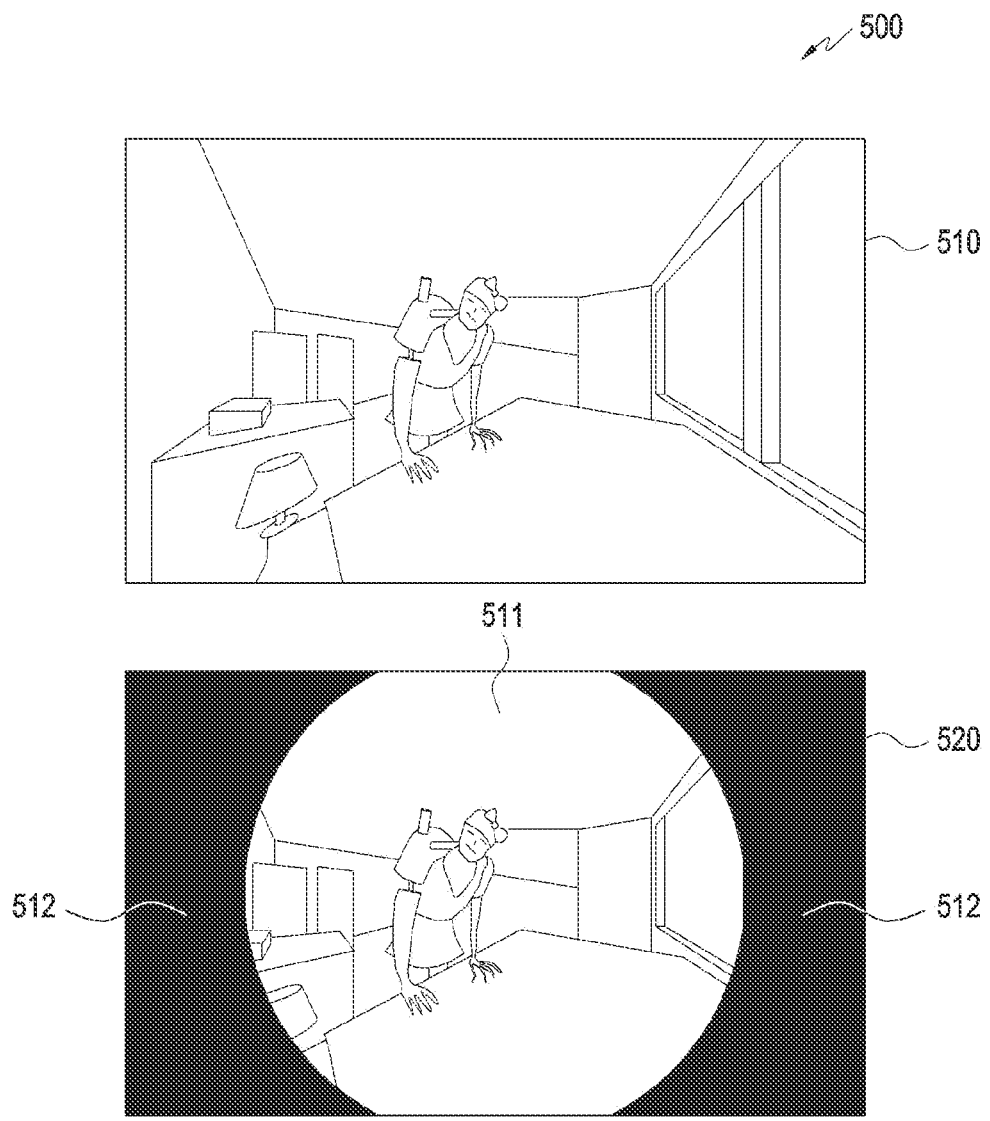
FIG. 5 is a diagram illustrating a vignetting effect according to an embodiment of the disclosure.

FIG. 5 is a diagram 500 illustrating a vignetting effect according to an embodiment of the disclosure.

Referring to FIGS. 4 and 5, in an embodiment, in operation 401, the processor 120 may execute a VR application.

In an embodiment, the VR application may include a game application and a video application capable of providing VR content provided in a virtual space of a virtual environment (or also referred to as "virtual world"). However, the VR application is not limited to the aforementioned game application and video application.

In an embodiment, the VR content may include content capable of representing a scene viewed from the perspective of an avatar (or character) corresponding to a user in a virtual space (hereinafter, the avatar corresponding to the user is referred to as an "avatar corresponding to the user" or "avatar"). For example, the VR content may include content capable of representing a scene of a first-person view corresponding to a direction (or a user's gaze) toward which the electronic device 101 is facing. In an embodiment, the scene of the first person view may not include the avatar corresponding to the user, or may include a part of a body of the avatar (e.g., the avatar's hand) or an item worn by the avatar.

In an embodiment, the processor 120 may execute a vignetting function while the VR application is executed. For example, if the vignetting function is set to be executed when the VR application is executed, the processor 120 may activate (or turn on) the vignetting function (also referred to as "motion sickness reduction function") based on the execution of the VR application.

In an embodiment, the vignetting function may be a function of applying a vignetting effect (also referred to as "tunneling effect") to a screen of VR content. For example, the vignetting function may be a function of narrowing the field of view (or viewing angle) that the user can see on screen of the VR content. For example, the vignetting function may be a function of darkening the outer (or edge) portion of the screen of the VR content. Hereinafter, with reference to FIG. 5, the vignetting function or vignetting effect will be described in more detail.

Referring to FIG. 5, image 510 may represent a screen before applying a vignetting effect, and image 520 may represent a screen after applying a vignetting effect. Comparing the image 510 and the image 520, an area 511 including a center of the image 520 may be represented as the same as a corresponding area of the image 510. On the other hand, the region 512 corresponding to the edge portion of the image 520 may be represented dark. When the vignetting effect is applied to the image 510, like the image 520, a range of the user's view of the screen of the VR content screen may be narrowed. Hereinafter, a region to which a vignetting effect is applied within a screen of the VR content (e.g., a region 512 darkened by the vignetting effect) will be referred to as a "vignetting region".

Referring back to FIG. 4, in operation 403, in an embodiment, the processor 120 may detect a movement of an avatar corresponding to the user in the virtual space of the VR content displayed while the VR application is executed.

In an embodiment, the avatar corresponding to the user may be moved in the virtual space of the VR content. For example, a location of the avatar corresponding to the user may be changed on a virtual map representing the virtual space of the VR content.

In an embodiment, the processor 120 may move the avatar corresponding to the user in the virtual space of the VR content displayed through the electronic device 101, based on an input to a controller (e.g., a joystick, a keyboard, or a mouse) connected wirelessly (or wired) to the electronic device 101.

In an embodiment, the processor 120, based on the input to the input module 150 (e.g., touch pad, key, button) comprised in the electronic device 101, may move the avatar corresponding to the user in the virtual space of the VR content displayed through the electronic device 101.

In an embodiment, the processor 120 may move the avatar corresponding to the user by moving an object represented in the virtual space of the VR content. For example, the avatar corresponding to the user in VR content may ride a virtual means of transportation (e.g., a virtual vehicle, a virtual plane, or a virtual roller coaster) (or an object representing virtual transportation means) capable of moving the avatar. When an input for moving the virtual transportation means is obtained, the processor 120 may move the avatar riding on the virtual transportation means together with the virtual transportation means.

However, the method of moving the avatar is not limited to the above examples. Alternatively, the above-described examples of moving the avatar may be examples of moving the avatar corresponding to the user in the virtual space of VR content without an actual movement of the user (e.g., without changing the user's location).

In an embodiment, when the avatar corresponding to the user is moved, the processor 120 may update the position of the avatar corresponding to the user in the virtual map corresponding to the virtual space.

In operation 405, in an embodiment, the processor 120 may display a VR content screen to which a changeable vignetting effect is applied through the display 221 based on the detection of the movement of the avatar corresponding to the user.

In an embodiment, the processor 120 may apply a changeable vignetting effect to the VR content screen to be displayed through the display 221 while the movement of the avatar corresponding to the user is detected. For example, when an input for moving an avatar corresponding to the user is obtained, the processor 120 may apply a changeable vignetting effect for a screen representing a movement of the avatar corresponding to the user to be displayed through the display 221. For example, the processor 120 may apply a changeable vignetting effect to the VR content screen to be displayed through the display 221 whenever the movement of the avatar corresponding to the user is detected. However, it is not limited thereto. For example, the processor 120, regardless of the movement of the avatar corresponding to the user, may apply a changeable vignetting effect to VR content to be displayed through the display 221, after the vignetting function (sickness reduction function) is activated, for a designated time or until the VR application is terminated.

In an embodiment, the processor 120 may apply a changeable vignetting effect to a screen of VR content to be displayed through the display 221. For example, the processor 120 may change the time at which the vignetting effect is applied to the VR content and/or the vignetting area (e.g., the size of the vignetting area) to which the vignetting effect is applied. Hereinafter, with reference to FIGS. 6 to 15, a method of applying a changeable vignetting effect will be described in detail.

Figure 6:
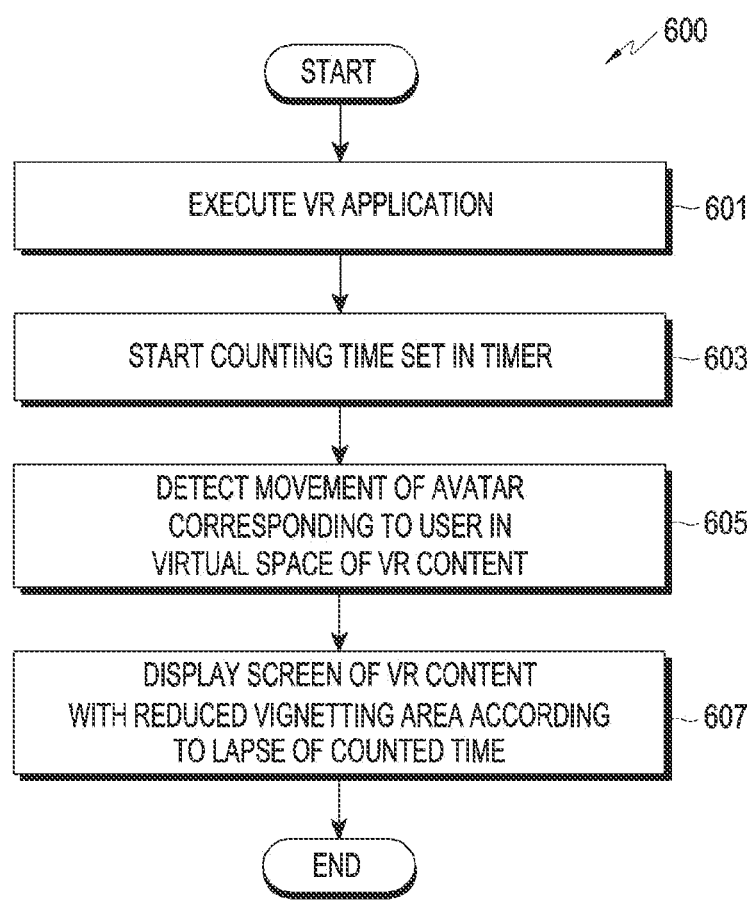
FIG. 6 is a flowchart illustrating a method of changing a vignetting area based on a timer setting according to an embodiment of the disclosure.

FIG. 6 is a flowchart 600 illustrating a method of changing a vignetting area based on a timer setting according to an embodiment of the disclosure.

Figure 7:
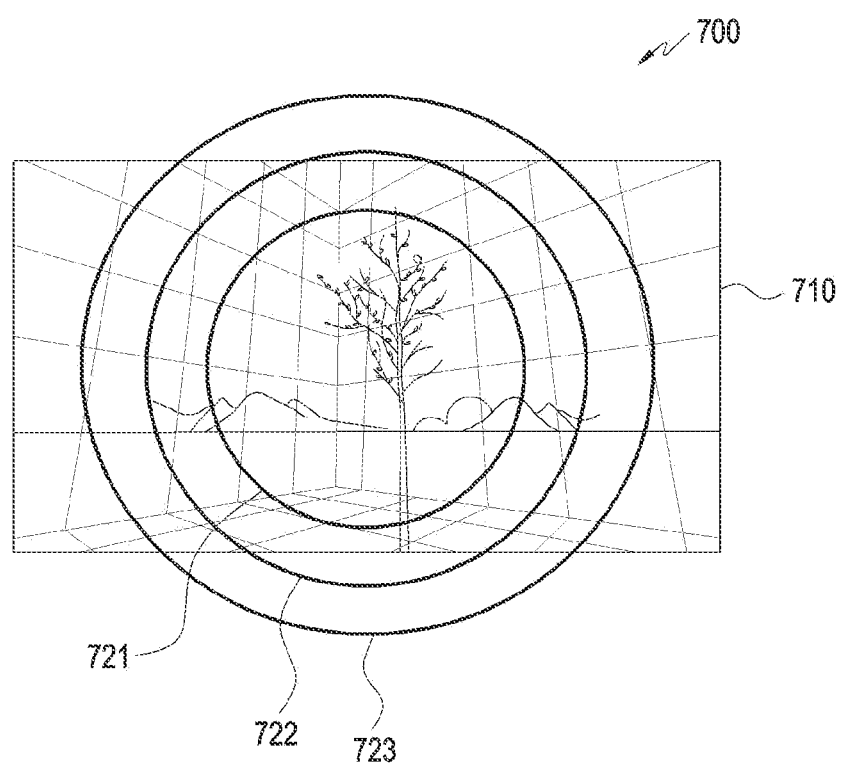
FIG. 7 is a diagram illustrating a method of changing a vignetting area based on a timer setting according to an embodiment of the disclosure.

FIG. 7 is a diagram 700 illustrating a method of changing a vignetting area based on a timer setting according to an embodiment of the disclosure.

Referring to FIGS. 6 and 7, in operation 601, in an embodiment, the processor 120 may execute a VR application.

Since operation 601 is at least partially the same as or similar to operation 401 of FIG. 4, a detailed description thereof will be omitted.

In operation 603, in an embodiment, the processor 120 may start counting a time set in the timer.

In an embodiment, the processor 120, when the VR application is executed in a state in which the vignetting function is activated for the VR application, may start counting the time set in the timer from the time (e.g., an initial setting time set for the vignetting function to be performed) (hereinafter also referred to as "initial setting time of the timer") at which the VR application is executed. In an embodiment, when the vignetting function is activated after the VR application is executed, the processor 120 may start counting the time set in the timer from the time at which the vignetting function is activated.

In an embodiment, the processor 120 may start counting the time set in the timer from the time at which the movement of the avatar corresponding to the user is first detected in the virtual space of the VR content while the VR application is running and the vignetting function is activated. For example, in FIG. 6, the example embodiment is illustrated that, after starting counting for the time set in the timer in operation 603, an operation of detecting movement of an avatar corresponding to a user in a virtual space of VR content is performed in operation 605, but it is not limited thereto, and the processor 120 may start counting the time set in the timer in response to first detecting the movement of the avatar corresponding to the user in the virtual space of the VR content.

In an embodiment, the processor 120 may set an initial setting time of the timer based on a user input. For example, the processor 120 may set the time to be counted by the timer to 1000 seconds based on a user input for inputting an initial setting time of the timer, such as 1000 seconds. For example, the processor 120 may set an amount of time which the timer may count based on user input selecting one intensity among intensities to be applied to the vignetting effect (or information (or icons) indicating the times during which the vignetting function is to be performed) such as strong (e.g. 1500 seconds), medium (e.g. 1000 seconds), and weak (e.g. 500 seconds)(e.g., if "strong" is selected, the time during which the vignetting function will be performed is set to 1500 seconds). However, the method of setting the initial setting time of the timer is not limited to the above examples.

In operation 605, in an embodiment, the processor 120 may detect the movement of the avatar corresponding to the user in the virtual space of VR content displayed while the VR application is executed.

Since operation 605 is at least partially the same as or similar to operation 403 of FIG. 4, a duplicate description of operation 403 will be omitted.

In an embodiment, the processor 120 may count the time set in the timer during the time when the movement of the avatar corresponding to the user is detected in the virtual space of the VR content. For example, the processor 120 counts the time set in the timer every time during which the movement of the avatar corresponding to the user is detected in the virtual space of the VR content (e.g., every time period), and stop (e.g., temporarily pause) the operation of counting the time set in the timer while the movement of the avatar is not detected. The processor 120, after the operation of counting the time set in the timer (e.g., the remaining time for the timer to count) (hereinafter, remaining time for the timer to count is also referred to as "the time currently set in the timer") is stopped, may perform again the stopped counting operation from a time at which the movement of the avatar is detected. For example, the processor 120, when the movement of the avatar is detected after the timer initially set to 1000 seconds is temporarily paused at a time when 100 seconds has elapsed, may start a counting operation of 900 seconds from the time at which the movement of the avatar is detected. However, it is not limited thereto, and in an embodiment, the processor 120 may continuously perform a counting operation for the time set in the timer regardless of the movement of the avatar corresponding to the user in the virtual space of the VR content.

In operation 607, in an embodiment, the processor 120, via the display 221, according to the lapse of time counted from the time set in the timer (e.g., as a counting operation for the time set in the timer is performed) may display a screen of the VR content with a reduced vignetting area.

In an embodiment, as the counting operation for the time set in the timer is performed (e.g., as the time at which the vignetting effect is applied to the VR content screen elapses), the processor 120 gradually may reduce a vignetting area applied to the screen of the VR content. For example, in FIG. 7, the processor 120 may determine as a vignetting area the area where the outside of the line 721 and the VR content screen 710 overlap at a first point in time when counting for the time set in the timer (the initial setting time of the timer) starts. As the time set in the timer is counted, the processor 120 gradually (or sequentially) may determine, as a vignetting area, the area where the VR content screen 710 overlaps the outside of the second line 722 and the area where the outside of the third line 723 overlaps the VR content screen 710 at a second time point after the first time point and a third time point after the second time point, respectively. In FIG. 7, the lines used to determine the vignetting area (e.g., the first line 721, the second line 722, and the third line 723) are illustrated as having a circular shape, but are not limited thereto, and may be implemented in various forms.

In an embodiment, the processor 120 may display through the display 221 the VR content screen to which applying the gradually reduced vignetting area as the counting operation for the time set in the timer is performed (e.g., as the time at which the vignetting effect is applied to the VR content screen elapses).

In an embodiment, the processor 120 may set (or adjust) a speed at which the vignetting area is reduced (e.g., reduction amount of a size (or area) of the vignette area per time) according to the time (e.g., the length of time) set in the timer. For example, the processor 120 may set the speed at which the vignetting area is reduced, such that if a first initial set time (e.g., 1000 seconds) is set in the timer, the vignetting area is reduced at a first speed while counting the first initial time and if a second initial setting time (e.g., 500 seconds) shorter than the first initial setting time is set in the timer, the vignetting area is reduced at a second speed faster than the first speed.

In an embodiment, the processor 120 may terminate the vignetting operation on the VR content screen when the timer expires (e.g., when counting for the time set in the timer is completed). For example, when the timer expires, the processor 120 may end the vignetting operation on the screen of the VR content even if movement of the avatar corresponding to the user is detected in the virtual space of the VR content. In an embodiment, even when the user experiences motion sickness as an avatar corresponding to the user is moved in the virtual space of the VR content, the user may adapt to the VR content after a certain amount of time (e.g., the time set in the timer) has elapsed. For example, the user may adapt to the VR content by watching the VR content for a certain period of time after experiencing motion sickness, and may no longer experience motion sickness. Accordingly, after the timer expires, the processor 120 may end the vignetting operation on the screen of the VR content even if movement of the avatar corresponding to the user is detected in the virtual space of the VR content. However, it is not limited thereto.

Figure 8:
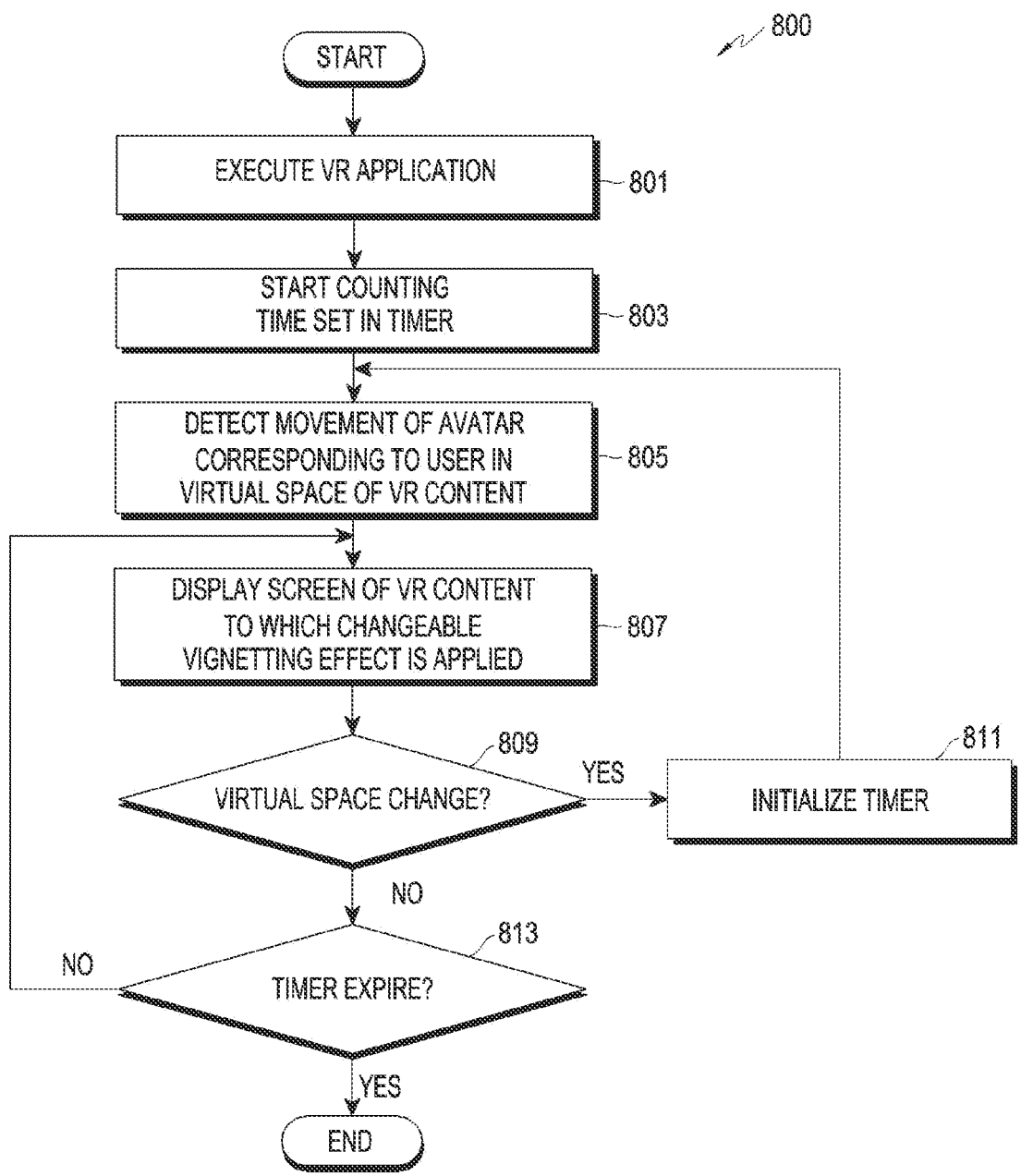
FIG. 8 is a flowchart illustrating a method of setting a timer based on a change in virtual space according to an embodiment of the disclosure.

FIG. 8 is a flowchart 800 illustrating a method of setting a timer based on a change in virtual space according to an embodiment of the disclosure.

Figure 9:
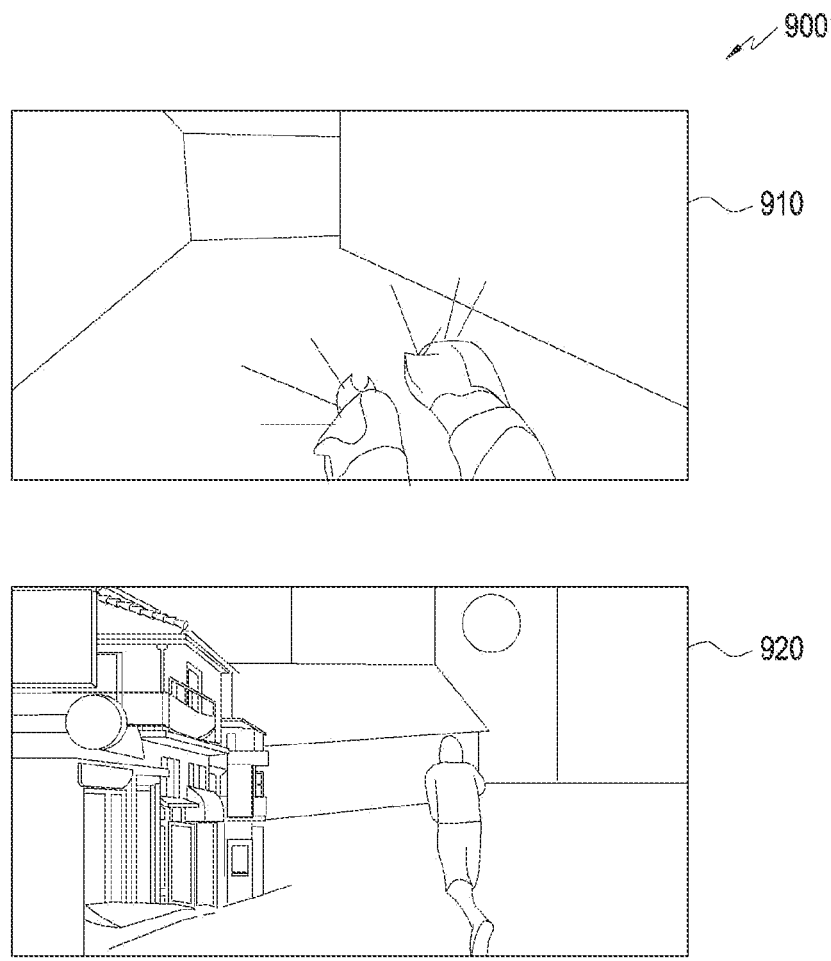
FIG. 9 is a diagram illustrating a method of setting a timer based on a change in virtual space according to an embodiment of the disclosure.

FIG. 9 is a diagram 900 illustrating a method of setting a timer based on a change in virtual space according to an embodiment of the disclosure.

Referring to FIGS. 8 and 9, in operation 801, in an embodiment, the processor 120 may execute a VR application.

Since operation 801 is at least partially the same as or similar to operation 401 of FIG. 4, a detailed description thereof will be omitted.

At operation 803, in an embodiment, the processor 120 may start counting the time set in the timer. For example, the processor 120 may set an initial setting time of the timer to 1000 seconds.

Since operation 803 is at least partially the same as or similar to operation 603 of FIG. 6, a detailed description thereof will be omitted.

In operation 805, in an embodiment, the processor 120 may detect the movement of the avatar corresponding to the user in the virtual space of the displayed VR content while the VR application is executed.

Since operation 805 is at least partially the same as or similar to operation 605 of FIG. 6, a detailed description thereof will be omitted.

In operation 807, in an embodiment, the processor 120, through the display 221, according to passage of time (time elapsing) counted from the time set in the timer, may display the screen of the VR content to which the changeable vignetting effect is applied.

Since operation 807 is at least partially the same as or similar to operation 405 of FIG. 4, a detailed description thereof will be omitted.

In operation 809, in an embodiment, the processor 120 may identify whether the virtual space of the VR content is changed.

In an embodiment, the processor 120 may change the virtual space where the avatar is located from a first virtual space to a second virtual space based on the movement of the avatar corresponding to the user. For example, in FIG. 9, based on the movement of the avatar corresponding to the user, the processor 120 may change the virtual space in which the avatar is located from a first virtual space representing an indoor space such as the screen 910 to a second virtual space representing the outdoors such as the screen 920.

In an embodiment, the processor 120 may identify whether the virtual space of the VR content is changed based on the movement of the avatar corresponding to the user.

In an embodiment, the processor 120 may change the virtual space of the VR content according to a change of a scene, a stage, or a scenario within the VR content (e.g., a VR game).

In an embodiment, the processor 120 may identify whether a virtual space of the VR content is changed based on a change of a scene, stage, or scenario within the VR content.

In an embodiment, the processor 120 may instantaneously change the virtual space where the avatar is located from the first virtual space to the second virtual space based on a user input.

In an embodiment, the above-described change of the virtual space may include an abrupt (or instantaneous) change of the virtual space viewed from a position and/or a viewpoint of the avatar.

When it is identified that the virtual space of the VR content is changed in operation 809, the processor 120 may initialize a timer in operation 811.

In an embodiment, the processor 120 may change a setting time of the timer from the time currently set for the timer (e.g., remaining time for the timer to count) to the initially setting time of the timer (e.g., resetting the timer) if it is identified that the virtual space of the VR content is changed (e.g., if it is identified that the avatar corresponding to the user is located in a virtual space different from a previous virtual space). For example, if the initial setting time of the timer is 1000 seconds and the currently setting time of the timer is 995 seconds, the processor 120 may set the setting time of the timer to the initial setting time of 1000 seconds.

In an embodiment, the processor 120 may perform operation 803 after initializing the timer. For example, the processor 120 may restart the counting of the time set in the timer after initializing the timer.

If it is identified in operation 809 that the virtual space of the VR content is not changed, in operation 813, in an embodiment, the processor 120 may identify whether the timer expires.

If the timer does not expire in operation 813, in an embodiment, the processor 120 may perform operation 805. For example, if the timer has not expired, the processor 120 may detect the movement of the avatar corresponding to the user in the virtual space of the VR content while the timer is counting the currently set time.

Although not shown in FIG. 8, in an embodiment, the processor 120, if it is identified that the changed virtual space of the VR content is the first virtual space where the avatar corresponding to the user was previously located, the processor 120 may set, as the time of the timer (e.g., the remaining time for the timer to count), a time set in the timer at the first time point (e.g., the time remaining in the timer at the first time point in time) when the first virtual space was changed to a virtual space different from the virtual space. For example, the time set in the timer may be 300 seconds at a first time point when the avatar corresponding to the user moves from the first virtual space to the second virtual space. If the avatar corresponding to the user is moved from the second virtual space to the first virtual space again, the processor 120 sets, as a time for the timer to count, the remaining time 300 seconds which was set in the timer at a time point when the avatar corresponding to the user was moved from the first virtual space to the second virtual space.

In an embodiment, the processor 120 may set the time of the timer to the initially set time of the timer (e.g., the timer is initialized) if it is identified that the changed virtual space of the VR content is the first virtual space where the avatar corresponding to the user was previously located and if the virtual space is changed back to the first virtual space after a designated time has elapsed from the first time point when there was a change from the first virtual space to a virtual space different from the virtual space.

In an embodiment, the processor 120 may set, as a time of the timer, a time set in the timer at a time point when the virtual space was previously changed from the first virtual space to a virtual space different from the first virtual space if it is identified that the changed virtual space of the VR content is the first virtual space where the avatar corresponding to the user was previously located and if the virtual space is changed back to the first virtual space before the designated time elapses from the first time point when there was a change from the first virtual space to a virtual space different from the virtual space.

Figure 10:
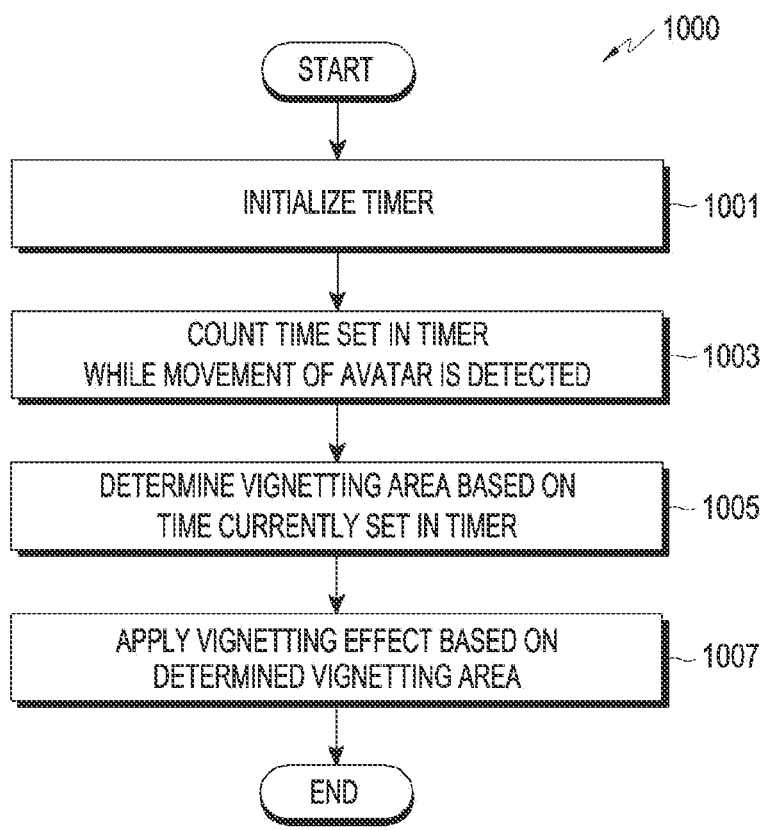
FIG. 10 is a flowchart illustrating a method of determining a vignetting area based on a time set in a timer according to an embodiment of the disclosure.

FIG. 10 is a flowchart 1000 illustrating a method of determining a vignetting area based on a time set in a timer according to an embodiment of the disclosure.

Referring to FIG. 10, in operation 1001, in an embodiment, the processor 120 may initialize a timer. For example, the processor 120 may set a time of the timer (e.g., an initial setting time of the timer) to perform the vignetting function if VR content is displayed by executing the VR application or if the virtual space is changed as described above.

In operation 1003, in an embodiment, the processor 120 may start counting the time set in the timer while the movement of the avatar corresponding to the user is detected in the virtual space of the VR content. However, it is not limited thereto, and the processor 120 may continue to count the time set in the timer even at a time when movement of an avatar corresponding to the user is not detected in the virtual space of the VR content.

In operation 1005, in an embodiment, the processor 120 may determine a vignetting area based on a time currently set in the timer.

In an embodiment, the processor 120 may determine a vignetting area based on a time interval to which a current time set in a timer belongs.

In an embodiment, the processor 120 may classify the initial setting time of the timer into a plurality of time intervals. For example, if an initial setting time of the timer is 1000 seconds, the processor 120 may classify the 1000 seconds into ten time intervals, each of ten time intervals having 100 seconds.

In an embodiment, the processor 120 may determine to apply a vignetting area having a size (or a ratio of the vignetting area to a screen) corresponding to a time interval to which the current time set in the timer belongs to a screen to be displayed through the display 221. For example, if the initial setting time of the timer is 1000 seconds, which is divided into ten time intervals, each of ten time intervals having 100 seconds and if the time currently set in the timer corresponds to a first time interval (e.g., a time interval of 900 seconds to 1000 seconds), the processor 120 may determine to apply a vignetting area in which a ratio of the vignetting area (e.g., a size of the vignetting area) to a screen (e.g., a size of the screen) is about 50% to the screen to be displayed through the display 221. If the currently set time set in the timer corresponds to a second time interval (e.g., the time interval of 800 seconds to 900 seconds), the processor 120 may determine to apply a vignetting area where the ratio of the vignetting area (e.g., a size of the vignette area) to the screen (e.g., a size of the screen) is approximately 40% to the screen to be displayed through the display 221. If the currently set time set in the timer corresponds to a third time interval (e.g., the time interval of 700 seconds to 800 seconds), the processor 120 may determine to apply a vignetting area where the ratio of the vignetting area (e.g., a size of the vignette area) to the screen (e.g., a size of the screen) is approximately 30% to the screen to be displayed through the display 221. In an embodiment, as described above, the processor 120 may identify the time interval to which the time currently set in the timer belongs as the time set in the timer passes, and determine to apply a vignetting area, a size of the vignetting area corresponding to the identified time interval (or a ratio of the vignetting area to a screen) being reduced, to a screen to be displayed through the display 221.

In operation 1007, in an embodiment, the processor 120 may apply a vignetting effect to the VR content screen to be displayed through the display 221 based on the determined vignetting area. The processor 120 may display the VR content screen to which the vignetting effect is applied through the display 221.

Figure 11:
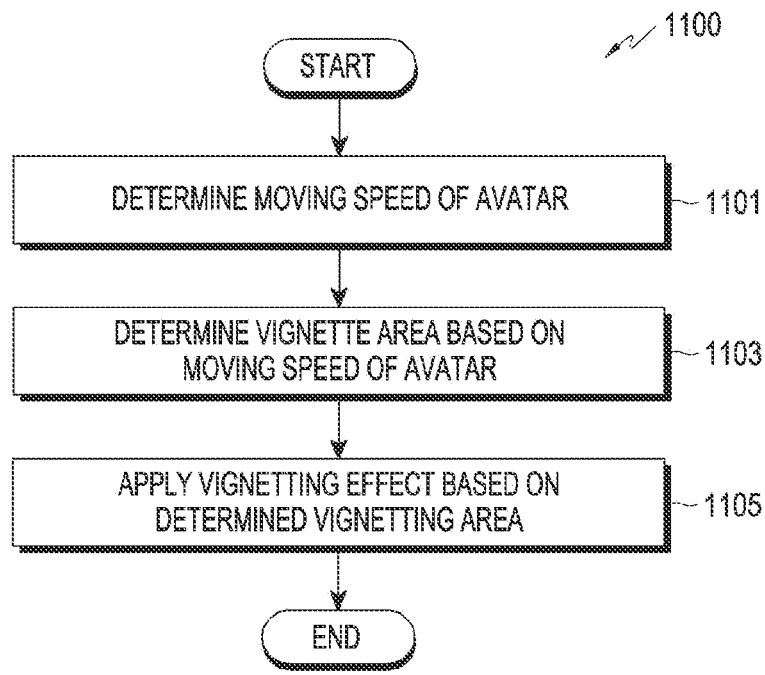
FIG. 11 is a flowchart illustrating a method of determining a vignetting area based on a moving speed of an avatar according to an embodiment of the disclosure.

FIG. 11 is a flowchart 1100 illustrating a method of determining a vignetting area based on a moving speed of an avatar according to an embodiment of the disclosure.

Referring to FIG. 11, in operation 1101, in an embodiment, the processor 120 may determine a moving speed of an avatar corresponding to a user in a virtual space of VR content. In an embodiment, the processor 120, based on an input to a controller (e.g., joystick, keyboard, mouse) (or an input module) connected to the electronic device 101 wirelessly (or wired), may move an avatar corresponding to the user in the virtual space of the displayed VR content through the electronic device 101. The processor 120 may move the avatar corresponding to the user at different speeds in the virtual space according to the input. For example, the processor 120 may move the avatar corresponding to the user in the virtual space at a first speed based on a first input to the controller. The processor 120 may move the avatar corresponding to the user in the virtual space at a second speed faster (or slower) than the first speed, based on a second input to the controller. The processor 120 may, based on the input, determine the moving speed of an avatar corresponding to the user in the virtual space (e.g., a speed at which a position of the avatar is changed).

In an embodiment, the processor 120 may move the avatar corresponding to the user by moving an object in the virtual space of VR content. For example, the avatar corresponding to the user in VR content may ride a virtual transportation means (e.g., a virtual vehicle, a virtual airplane, or a virtual roller coaster) capable of moving the avatar. If the input for moving the virtual transportation means is obtained, the processor 120 may move the avatar riding the virtual transportation means together with the virtual transportation means. The processor 120 may determine the moving speed of the virtual transportation means on which the avatar rides as the moving speed of the avatar corresponding to the user in the virtual space of the VR content. In an embodiment, the processor 120 may determine the moving speed of the avatar corresponding to the user in a virtual space based on the virtual transportation means and/or an input for moving the avatar.

In operation 1103, the processor 120 may determine a vignette area (e.g., a size of the vignette area) based on the moving speed of the avatar.

In an embodiment, the processor 120 may determine the vignetting area based on a speed range to which the moving speed of the avatar corresponding to the user belongs. For example, when the moving speed of the avatar corresponding to the user is included in a first speed range, the processor 120 may determine the vignetting area such that a ratio of the vignetting area to a screen is about 80%. The processor 120, when the moving speed of the avatar corresponding to the user is included in a second speed range (e.g., a maximum speed of the second speed range is less than a minimum speed of the first speed range), may determine the vignetting area such that the ratio of the vignetting area to the screen is about 50%.

In an embodiment, the processor 120 may increase or decrease the size of the vignetting area based on the moving speed of the avatar corresponding to the user. For example, the processor 120 may increase the size of the vignetting area when the moving speed of the avatar corresponding to the user increases. For example, the processor 120 may reduce the vignetting area when the moving speed of the avatar corresponding to the user decreases.

In an embodiment, the processor 120 may determine the size of the vignetting area based on whether the moving speed of the avatar corresponding to the user is greater than or equal to a designated speed. For example, when the moving speed of the avatar corresponding to the user is equal to or greater than a designated speed, the processor 120 may determine the vignetting area so that the ratio of the vignetting area to the screen is about 80%. When the moving speed of the avatar corresponding to the user is less than the designated speed, the processor 120 may determine the vignetting area such that the ratio of the vignetting area to the screen is about 50%.

In an embodiment, the processor 120 may determine whether to apply the vignetting effect based on the moving speed of the avatar corresponding to the user. For example, the processor 120 may determine to apply a vignetting effect to the screen when the moving speed of the avatar corresponding to the user is greater than or equal to a designated speed. The processor 120 may determine not to apply the vignetting effect to the screen when the moving speed of the avatar corresponding to the user is less than the designated speed.

In an embodiment, the processor 120 may determine the vignetting area such that the size of the vignetting area increases or decreases in proportion to an increase or decrease of the movement speed of the avatar corresponding to the user.

In operation 1105, in an embodiment, the processor 120 may, based on the determined vignetting area, apply a vignetting effect to the VR content screen to be displayed through the display 221. The processor 120 may display the VR content screen to which the vignetting effect is applied through the display 221.

Figure 12:
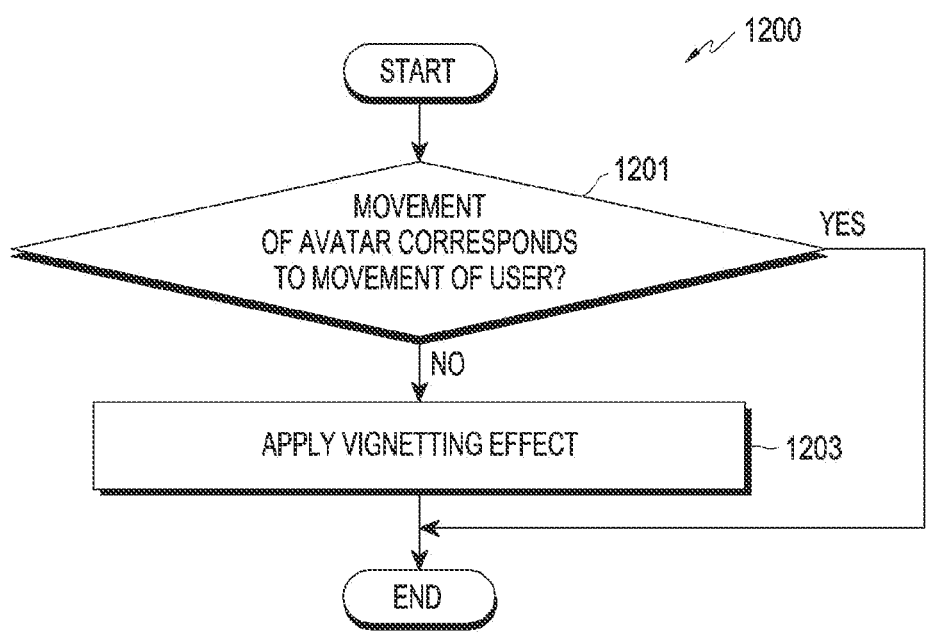
FIG. 12 is a flowchart illustrating a method of applying a vignetting effect based on a user's motion according to an embodiment of the disclosure.

FIG. 12 is a flowchart 1200 illustrating a method of applying a vignetting effect based on a user's motion according to an embodiment of the disclosure.

Referring to FIG. 12, in operation 1201, in an embodiment, the processor 120 may identify whether a movement of an avatar corresponding to a user corresponds to a movement of the user.

In an embodiment, the processor 120 may move the avatar corresponding to the user in the virtual space of the VR content displayed through the electronic device 101 based on an input to a controller (e.g., a joystick, keyboard, mouse) connected to the electronic device 101 wirelessly (or wired).

In an embodiment, the processor 120 may move the avatar corresponding to the user in the virtual space of the VR content displayed through the electronic device 101 based on an input to an input module (e.g., a touch pad, a key, or a button) included in the electronic device 101.

In an embodiment, the processor 120 may move the avatar corresponding to the user by moving an object in the virtual space of the VR content. For example, the avatar corresponding to the user in the VR content may ride a virtual transportation means (e.g., a virtual vehicle, a virtual airplane, or a virtual roller coaster) capable of moving the avatar. If an input for moving the virtual transportation means is obtained, the processor 120 may move the avatar riding on the virtual transportation means together with the virtual moving means.

However, the above-described examples of moving the avatar may be examples of moving the avatar corresponding to the user in the virtual space of VR content without the user performing an action for actual movement (e.g., without changing the user's location).

In an embodiment, the processor 120 may detect the movement of the electronic device 101 corresponding to the user's movement through a sensor (e.g., a sensor supporting degrees of freedom (DOF)). For example, when the location of the user is changed, the processor 120 may identify that the location of the electronic device 101 worn by the user is changed through the sensor.

In an embodiment, the processor 120 may detect a user's motion, which is capable of moving the avatar corresponding to the user, through an external sensor. For example, the user may wear the electronic device 101 on a head and the user may wear, on a feet (or legs), VR shoes (or VR boots) including an external sensor (and rotating electric wheels to keep the user in place while performing a walking motion) detecting the user's walking motion (or running motion) without actual movement of the user (e.g., the user is substantially in place). While the VR content is provided, the processor 120 may receive information about a user's walking motion from the external sensor included in the VR shoes through the communication module 190. Based on the information, the processor 120 may move the avatar corresponding to the user corresponding to the walking motion of the user. For example, if the user uses the VR content on a VR treadmill, the processor 120 may move the avatar corresponding to the user based on the user's movement on the VR treadmill.

In an embodiment, the processor 120 may move the avatar corresponding to the user in the virtual space of the VR content based on the movement of the electronic device 101 corresponding to the user's movement. For example, the processor 120 may move the avatar corresponding to the user in a direction and/or distance corresponding to the moving direction and/or distance of the electronic device 101.

In an embodiment, when the avatar corresponding to the user is moved in response to the user's actual movement, the user may not experience motion sickness.

In an embodiment, the processor 120, when the movement of the avatar corresponding to the user occurs in the virtual space of the VR content, the processor 120 may determine whether the movement of the avatar is caused by the actual movement of the user. For example, based on the movement of the electronic device 101 corresponding to the movement of the user, the processor 120 may identify whether the avatar corresponding to the user has moved in the virtual space of the VR content.

In operation 1201, if the movement of the avatar does not correspond to the movement of the user, in operation 1203, in an embodiment, the processor 120 applies a vignetting effect to the VR content screen to be displayed through the display 221.

In operation 1201, when the movement of the avatar corresponds to the movement of the user, in an embodiment, the processor 120 may not apply a vignetting effect to the VR content screen to be displayed through the display 221.

In an embodiment, if the processor 120 determines that the movement of the avatar corresponding to the user corresponds to the movement of the user while counting the time set in the timer, the processor 120 may stop the counting operation during a time of the avatar movement based on the movement of the user. After the timer's counting operation is temporarily stopped, the processor 120 may cause to the suspended timer to perform a counting operation if a movement (or movement of the avatar without the user's movement) of the avatar that does not correspond to the user's movement (e.g., the user's actual movement) is detected.

In an embodiment, when the electronic device 101 does not comprise a sensor supporting 6DOF (e.g., when the electronic device 101 comprises only a sensor supporting 3DOF), because the electronic device 101 sense the rotational movement of the user's head wearing the electronic device 10, whereas a change in the user's position cannot be sensed, the vignetting effect is applied regardless of the user's movement if the movement of the avatar corresponding to the user occurs.

Figure 13:
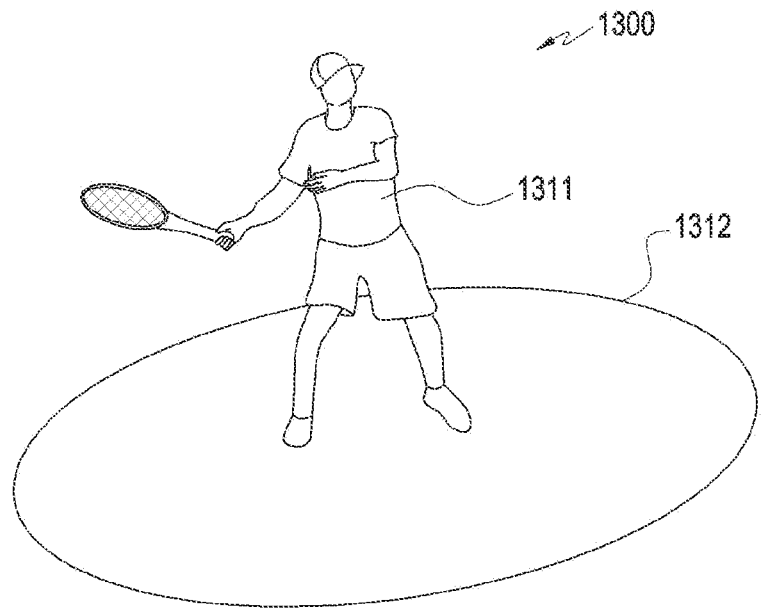
FIG. 13 is a diagram illustrating a method of applying a vignetting effect based on a movement of an avatar in a designated range of a virtual space according to an embodiment of the disclosure.

FIG. 13 is a diagram 1300 illustrating a method of applying a vignetting effect based on a movement of an avatar in a designated range of a virtual space according to an embodiment of the disclosure.

Referring to FIG. 13, in an embodiment, the processor 120 may not apply the vignetting effect to a screen of a VR content displayed through the display 221 if the movement of the avatar occurs within a designated range (or designated boundary) of the virtual space. In an embodiment, the designated range of the virtual space may be designated based on a current position of the avatar.

In an embodiment, as shown in FIG. 13, the processor 120, when the avatar 1311 corresponding to the user moves within a designated range (e.g., an area inside the line 1312) in the virtual space, may not apply a vignetting effect to the VR content screen. For example, the processor 120 may not apply a vignetting effect to the VR content screen if a location to which the avatar 1311 corresponding to the user will continuously move in the virtual space (e.g., the location to which the avatar 1311 will move by one input through the controller) is included within a designated range (e.g., an area inside the line 1312) based on the current position of the avatar 1311. The processor 120 may apply a vignetting effect to the VR content screen if the location to which the avatar 1311 corresponding to the user will continuously move in the virtual space is included outside a designated range based on the current position of the avatar 1311.

In an embodiment, the processor 120, when a distance to which the avatar corresponding to the user continuously moves within the virtual space (e.g., the distance to move the avatar 1311 by a single input through the controller) is less than or equal to a designated distance, may not apply a vignetting effect to the VR content screen. The processor 120 may apply a vignetting effect to the screen of the VR content if the distance to which the avatar corresponding to the user continuously moves within the virtual space exceeds the designated distance.

Figure 14:
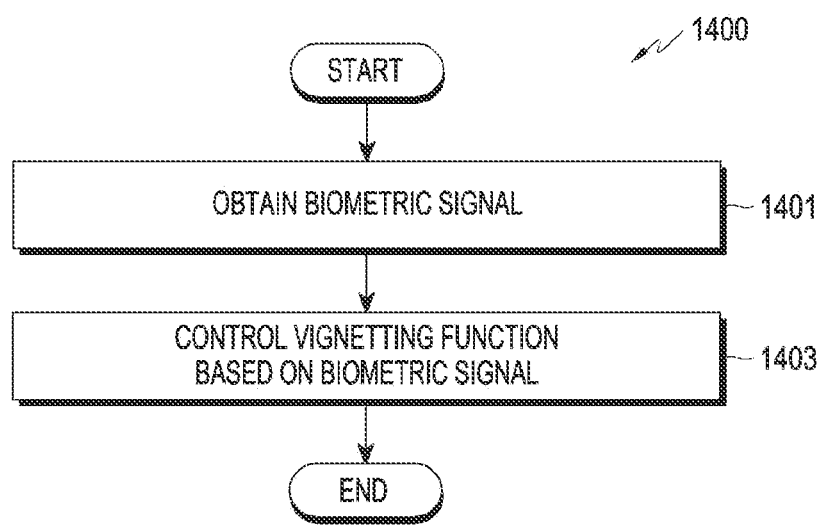
FIG. 14 is a flowchart illustrating a method of controlling a vignetting function based on a degree of motion sickness of a user according to an embodiment of the disclosure.

FIG. 14 is a flowchart 1400 illustrating a method of controlling a vignetting function based on a degree of motion sickness of a user according to an embodiment of the disclosure.

Referring to FIG. 14, in operation 1401, in an embodiment, the processor 120 may obtain a biometric signal of a user wearing the electronic device 101 through a biometric sensor.

In an embodiment, the processor 120 may obtain a user's biometric signal related to motion sickness (VR motion sickness) through a biometric sensor. For example, the processor 120 may obtain the user's biometric signal related to motion sickness through the biometric sensor, such as an electroencephalogram (EEG) signal, a heart rate (HR), an electromyography (EMG) signal, and/or eye movement of the user. However, the biometric signals of the user related to motion sickness are not limited to the above examples.

In operation 1403, in an embodiment, the processor 120 may control a vignetting function based on the biometric signal.

In an embodiment, the processor 120 may determine a degree of motion sickness (e.g., an index related to motion sickness, a level related to motion sickness) of the user based on the biometric signal.

In an embodiment, the processor 120 may control the vignetting function based on the degree of motion sickness of the user.

In an embodiment, the processor 120 may reinforce the vignetting function when the degree of motion sickness of the user is greater than or equal to a designated level while VR content is provided. For example, the processor 120 may increase the size of the vignetting area when the degree of motion sickness of the user is greater than or equal to a designated level while VR content is provided. For example, if the degree of motion sickness of the user is greater than or equal to the designated level while VR content is provided, the processor 120 may increase a time currently set in the timer (e.g., a time to be counted by the timer).

In an embodiment, the processor 120 may weaken the vignetting function when the degree of motion sickness of the user is less than a designated level while VR content is provided. For example, the processor 120 may reduce a size of the vignetting area when the degree of motion sickness of the user is less than the designated level while VR content is provided. For example, if the degree of motion sickness of the user is greater than or equal to the designated level while VR content is provided, the processor 120 may decrease the time currently set in the timer. However, the disclosure is not limited thereto, and for example, the processor 120 may deactivate the vignetting function when the degree of motion sickness of the user is less than a designated level while VR content is provided.

Although not shown in FIG. 14, in an embodiment, the processor 120 may control the vignetting function based on feedback on the degree of motion sickness of the user. For example, while VR content is provided, the processor 120 may display, through the display 221, information asking the user whether or not the user feels motion sickness. The processor 120 may continuously perform the vignetting function or reinforce the vignetting function based on the user's feedback that the user feels motion sickness. The processor 120 may terminate the vignetting function or weaken the vignetting function based on the user's feedback that the user does not feel motion sickness.

In an embodiment, the processor 120 may perform an operation of controlling the vignetting function based on the degree of motion sickness of the user of FIG. 14 if the moving speed of the avatar is greater than or equal to a designated speed.

Figure 15:
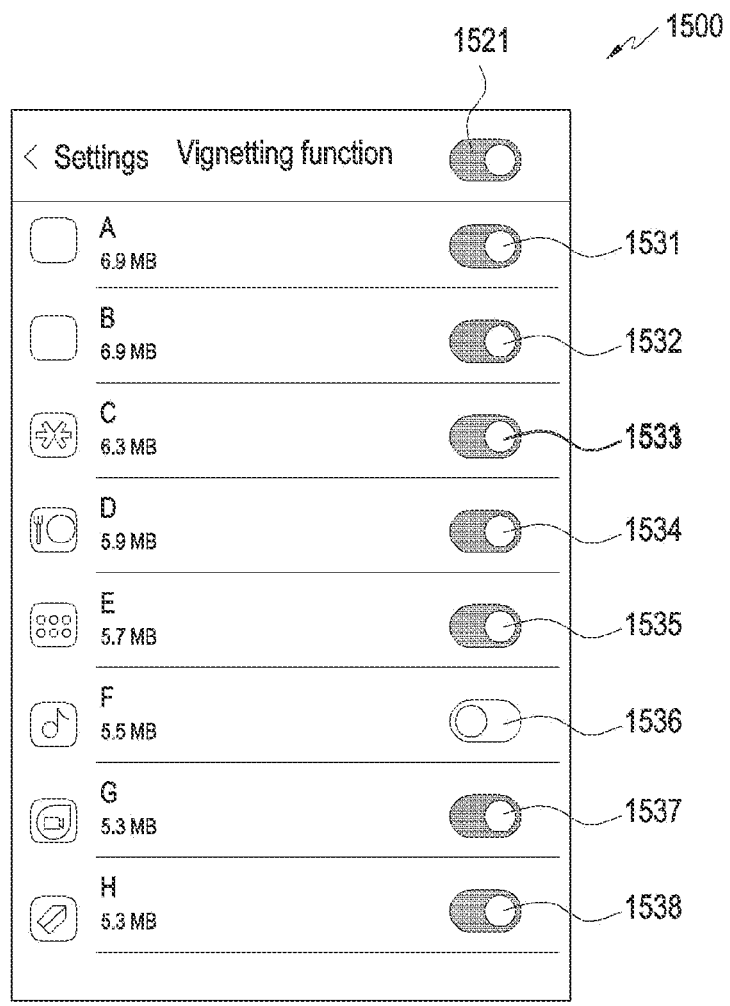
FIG. 15 is a diagram illustrating a method of setting a vignetting function according to an embodiment of the disclosure.

FIG. 15 is a diagram 1500 illustrating a method of setting a vignetting function according to an embodiment of the disclosure.

Referring to FIG. 15, in an embodiment, the processor 120 may set a vignetting function for each application (or program) or for all applications.

In an embodiment, FIG. 15 may show a screen for setting a vignetting function.

In an embodiment, the processor 120, through the display 221, may display objects (1531, 1532, 1533, 1534, 1535, 1536, 1537, 1538) for turning on or off the vignetting function of each application and an object 1521 for turning on or off the vignetting function of all applications. The processor 120 may turn on or off the vignetting function based on a user input for at least one of the objects 1531, 1532, 1533, 1534, 1535, 1536, 1537, and 1538. The processor 120 may turn on or off the vignetting function of all applications based on a user input for the object 1521.

A method of performing a vignetting function in the wearable electronic device 101 according to an embodiment may comprise executing a VR application. The method may comprise detecting a movement of an avatar corresponding to a user in a virtual space of VR content displayed while the VR application is executed. The method may comprise displaying, based on detecting the movement of the avatar, a screen of the VR content to which a changeable vignetting effect is applied through a display 221 of the wearable electronic device 101.

In an embodiment, the method may further comprise starting counting for a time set in a timer and applying the vignetting effect to the screen of the VR content while performing the counting.

In an embodiment, applying the vignetting effect may comprise gradually reducing a vignetting area within the screen to which the vignetting effect is applied while performing the counting.

In an embodiment, the method may comprise identifying whether the virtual space is changed from a first virtual space to a second virtual space and initializing the timer, based on identifying that the virtual space is changed from the first virtual space to the second virtual space.

In an embodiment, applying the vignetting effect may comprise classifying the time set in the timer into a plurality of time intervals, identifying a time interval to which a time currently set in the timer belongs among the plurality of time intervals, and applying the vignetting effect to a vignetting area having a size corresponding to the identified time interval.

In an embodiment, applying the vignetting effect may comprise determining a moving speed of the avatar within the virtual space, and determining, based on the determined speed, a vignetting area to which the vignetting effect is applied within the screen.

In an embodiment, applying the vignetting effect may comprise detecting a movement of the user through a sensor of the wearable electronic device 101, identifying whether the movement of the avatar corresponds to the movement of the user, and applying the vignetting effect based on identifying that the movement of the avatar does not correspond to the movement of the user, wherein the vignetting effect, based on identifying that the movement of the avatar corresponds to the movement of the user, is not applied.

In an embodiment, applying the vignetting effect may comprise identifying whether the movement of the avatar occurs within a designated range of the virtual space, applying the vignetting effect, based on identifying that the avatar moves outside the designated range of the virtual space by the movement of the avatar, wherein the vignetting effect, based on identifying that the movement of the avatar occurs within the designated range of the virtual space, is applied.

In an embodiment, the method may further comprise obtaining a biometric signal of user, determining a degree of motion sickness of the user, based on the biometric signal, and controlling the vignetting function, based on the degree of motion sickness of the user.

In an embodiment, the avatar is moved by a controller or by a virtual transportation means in which the avatar rides in the virtual space.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. In the disclosure, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., memory 130) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable electronic device comprising:
   a display;
   at least one processor comprising processing circuitry; and
   memory storing instructions that, when executed by the at least one processor individually or collectively, cause the wearable electronic device to:
   based on executing a virtual reality (VR) application, display, through the display, a screen of a VR content related to the VR application,
   detect a movement of an avatar corresponding to a user in the VR content and a time during which the movement of the avatar is detected,
   based on detecting the movement of the avatar, start counting for a time set in a timer,
   apply a vignetting effect to the screen of the VR content while performing the counting, wherein the vignetting effect is changeable based on the movement of the avatar and the time during which the movement of the avatar is detected,
   display a screen of the VR content to which the vignetting effect is applied through the display,
   while the screen of the VR content to which the vignetting effect is applied is displayed through the display, identify whether a virtual space of the VR content is changed from a first virtual space to a second virtual space, and
   based on identifying that the virtual space is changed from the first virtual space to the second virtual space, initialize the timer, wherein the vignetting effect is not applied to the screen of the VR content at a time when the virtual space is changed from the first virtual space to the second virtual space.

2. The wearable electronic device of claim 1, wherein the instructions, when executed by the at least one processor individually or collectively, cause the wearable electronic device to:
based on a scene, a stage, or a scenario within the VR content being changed, identify that the virtual space of the VR content is changed from the first virtual space to the second virtual space.

3. The wearable electronic device of claim 1, wherein the instructions, when executed by the at least one processor individually or collectively, cause the wearable electronic device to:
while performing the counting, gradually reduce a vignetting area within the screen to which the vignetting effect is applied.

4. The wearable electronic device of claim 1, wherein the instructions, when executed by the at least one processor individually or collectively, cause the wearable electronic device to:
classify the time set in the timer into a plurality of time intervals,
identify a time interval to which a time currently set in the timer belongs among the plurality of time intervals, and
apply the vignetting effect to a vignetting area having a size corresponding to the identified time interval.

5. The wearable electronic device of claim 1, wherein the instructions, when executed by the at least one processor individually or collectively, cause the wearable electronic device to:
determine a speed at which the avatar moves within the virtual space, and
determine, based on the determined speed, a vignetting area to which the vignetting effect is applied within the screen.

6. The wearable electronic device of claim 1, further comprising a sensor,
wherein the instructions, when executed by the at least one processor individually or collectively, cause the wearable electronic device to:
detect a motion of the user through the sensor,
identify whether the movement of the avatar corresponds to the motion of the user, and
apply the vignetting effect based on identifying that the movement of the avatar does not correspond to the motion of the user, wherein the vignetting effect, based on identifying that the movement of the avatar corresponds to the motion of the user, is not applied.

7. The wearable electronic device of claim 1, wherein the instructions, when executed by the at least one processor individually or collectively, cause the wearable electronic device to:
identify whether the movement of the avatar occurs within a designated range of the virtual space, and
apply the vignetting effect, based on identifying that the avatar moves outside the designated range of the virtual space by the movement of the avatar, wherein the vignetting effect, based on identifying that the movement of the avatar occurs within the designated range of the virtual space, is not applied.

8. The wearable electronic device of claim 1, wherein the instructions, when executed by the at least one processor individually or collectively, further cause the wearable electronic device to:
obtain biometric signal of the user,
determine a degree of motion sickness of the user, based on the biometric signal, and
control a vignetting function, based on the degree of motion sickness of the user.

9. The wearable electronic device of claim 1, wherein the movement of the avatar is controlled by a controller or by a virtual transportation means in which the avatar rides in the virtual space.

10. A method for performing a vignetting function in a wearable electronic device, the method comprising:
based on executing a virtual reality (VR) application, displaying, through a display of the wearable electronic device, a screen of a VR content related to the VR application;
detecting a movement of an avatar corresponding to a user in the VR content and a time during which the movement of the avatar is detected;
based on detecting the movement of the avatar, starting counting for a time set in a timer;
applying the vignetting effect to the screen of the VR content while performing the counting, wherein the vignetting effect is changeable based on the movement of the avatar and the time during which the movement of the avatar is detected;
displaying a screen of the VR content to which the vignetting effect is applied through the display;
while the screen of the VR content to which the vignetting effect is applied is displayed through the display, identifying whether a virtual space of the VR content is changed from a first virtual space to a second virtual space; and
based on identifying that the virtual space is changed from the first virtual space to the second virtual space, initializing the timer, wherein the vignetting effect is not applied to the screen of the VR content at a time when the virtual space is changed from the first virtual space to the second virtual space.

11. The method of claim 10, wherein the identifying of whether the virtual space of the VR content is changed from the first virtual space to the second virtual space comprises:
based on a scene, a stage, or a scenario within the VR content being changed, identifying that the virtual space of the VR content is changed from the first virtual space to the second virtual space.

12. The method of claim 10, wherein applying the vignetting effect comprises gradually reducing a vignetting area within a screen to which the vignetting effect is applied while performing the counting.

13. The method of claim 10, wherein applying the vignetting effect comprises:
classifying the time set in the timer into a plurality of time intervals;
identifying a time interval to which a time currently set in the timer belongs among the plurality of time intervals; and
applying the vignetting effect to a vignetting area having a size corresponding to the identified time interval.

14. The method of claim 10, wherein applying the vignetting effect comprises:
determining a moving speed of the avatar within the virtual space; and
determining, based on the determined speed, a vignetting area to which the vignetting effect is applied within the screen.

15. The method of claim 10, wherein applying the vignetting effect comprises:
detecting a motion of the user through a sensor of the wearable electronic device;

identifying whether the movement of the avatar corresponds to the motion of the user; and applying the vignetting effect based on identifying that the movement of the avatar does not correspond to the motion of the user, wherein the vignetting effect, based on identifying that the movement of the avatar corresponds to the motion of the user, is not applied.

16. The method of claim 10, wherein applying the vignetting effect comprises:

identifying whether the movement of the avatar occurs within a designated range of the virtual space; and applying the vignetting effect, based on identifying that the avatar moves outside the designated range of the virtual space by the movement of the avatar, wherein the vignetting effect, based on identifying that the movement of the avatar occurs within the designated range of the virtual space, is applied.

17. The method of claim 10, further comprising:

obtaining a biometric signal of the user;

determining a degree of motion sickness of the user, based on the biometric signal; and controlling the vignetting function, based on the degree of motion sickness of the user.

18. The method of claim 10, wherein the movement of the avatar is controlled by a controller or by a virtual transportation means in which the avatar rides in the virtual space.

19. The method of claim 10, wherein the time set in the timer is user selectable up to 1500 seconds.

* * * * *